United States Patent
Müller et al.

(10) Patent No.: US 11,356,637 B2
(45) Date of Patent: Jun. 7, 2022

(54) METHOD FOR A SAFE TRANSMISSION OF IMAGE DATA AND SAFE OPTOELECTRONIC SENSOR

(71) Applicant: SICK AG, Waldkirch (DE)

(72) Inventors: Lars Müller, Waldkirch (DE);
Matthias Neubauer, Waldkirch (DE);
Christoph Maier, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/441,778

(22) Filed: Jun. 14, 2019

(65) Prior Publication Data

US 2019/0394424 A1    Dec. 26, 2019

(30) Foreign Application Priority Data

Jun. 25, 2018  (DE) .......................... 102018115233.7

(51) Int. Cl.
*H04N 7/035* (2006.01)
*H04N 13/239* (2018.01)
*H04L 1/00* (2006.01)

(52) U.S. Cl.
CPC ......... *H04N 7/0357* (2013.01); *H04L 1/0041* (2013.01); *H04N 13/239* (2018.05)

(58) Field of Classification Search
CPC ... H04L 1/0041; H04N 13/239; H04N 7/0357
See application file for complete search history.

(56) References Cited

U.S. PATENT DOCUMENTS

| | | | | |
|---|---|---|---|---|
| 5,912,972 A * | 6/1999 | Barton | ................. | G06T 1/0028 |
| | | | | 348/E7.056 |
| 8,438,450 B2 * | 5/2013 | Isnardi | ............... | H03M 13/096 |
| | | | | 714/758 |
| 8,478,056 B2 | 7/2013 | Lee | | |
| 2009/0086826 A1 * | 4/2009 | May | ...................... | H04N 19/61 |
| | | | | 375/240.27 |
| 2009/0254530 A1 | 10/2009 | Jaffe et al. | | |
| 2014/0247983 A1 * | 9/2014 | MacInnis | .............. | H04N 19/14 |
| | | | | 382/166 |
| 2014/0314235 A1 * | 10/2014 | Matischek | .......... | H04N 1/4486 |
| | | | | 380/243 |
| 2015/0377413 A1 | 12/2015 | Doettling et al. | | |
| 2017/0085915 A1 * | 3/2017 | Kuusela | ................ | H04N 19/59 |
| 2018/0101940 A1 * | 4/2018 | Sohn | ....................... | H01L 22/12 |
| 2019/0394424 A1 * | 12/2019 | Muller | ................. | H04L 1/0041 |
| 2020/0218886 A1 * | 7/2020 | Sheets | .................... | G06F 21/45 |

OTHER PUBLICATIONS

German Search Report dated Jan. 23, 2019 corresponding to application No. 102018115233.7.

* cited by examiner

*Primary Examiner* — James T Boylan
(74) *Attorney, Agent, or Firm* — Nath, Goldberg & Meyer; Jerald L. Meyer (57) ABSTRACT

A method of transmitting image data in a safety sensor or in a safety system is provided, in which transmission errors are recognized in that meta information is added to the image data prior to the transmission and the meta information is checked after the transmission. The image data are here transmitted by an unsafe communication link, in particular a black channel, the meta information is prepended and/or appended to the image data and/or to the partial packets, and the meta information comprises a piece of information on the structure of the image data.

17 Claims, 3 Drawing Sheets

METHOD FOR A SAFE TRANSMISSION OF IMAGE DATA AND SAFE OPTOELECTRONIC SENSOR

FIELD

The invention relates to a method of transmitting image data in a safety sensor or in a safety system in which transmission errors are recognized and to a safe electronic sensor that internally uses the method, in particular a 3D camera.

BACKGROUND

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable securing measure is taken.

3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard ISO 13849 for safety of machinery and the machinery standard IEC61496 or EN61496 for electrosensitive protective equipment (ESPE). A number of measures have to be taken to satisfy these safety standards such as function tests, safe evaluation, for example by redundant evaluation channels, or a monitoring of the contamination of optical elements.

A possible error source is the transmission of data in the different processing stages. In a similar manner to a multi-channel evaluation, a multichannel, redundant data transmission is also conceivable as a securing measure; however, it requires a high hardware effort and very large bandwidths.

The safety standard IEC 61508 "Functional Safety of Electrical/Electronic/Programmable Electronic Safety-Related Systems (E/E/PE, or E/E/PES) or the standard on safety related fieldbus protocols IEC 61158, "Industrial communication networks—Fieldbus specifications—Part 1: Overview and guidance for the IEC 61158 and IEC 61784 series" introduce the term of a so-called "black channel". This is a communication channel for the communication from device to device. Communication by a black channel is, however, actually not considered failsafe; other measures therefore have to be taken to secure the integrity of the transferred data and to uncover errors.

Outside safety technology, there are various approaches to protect and to check the integrity of transmitted data. They are often directed to aspects such as confidentiality and authentication that at best play a subordinate role in safety technology. In other cases, a determination is made with reference to checksums and the like, when data have not arrived correctly, to then request them again, which can hardly be considered in a safety application that is as a rule very time-critical.

U.S. Pat. No. 5,912,972 discloses a method of embedding authentication information in image data or sound data. However, the original data stream is directly changed in so doing to accommodate the additional information. The changes and the errors thereby introduced should remain very small and therefore remain unnoticed on a superficial examination. Such a vague restriction is obviously intended for a human observer. Every change of the original data in safety engineering would require a very exact justification why no critical situation can be overlooked here.

So-called zero packets are used in U.S. Pat. No. 8,438,450 B2 to channel checksums into a data stream. Zero packets are padding or filling data without real information that would anyway be generated for a constant data rate. If there is no zero packet in a time window that exceeds the buffer capacities for the checksum calculation, the checksum is only calculated for some of the data. It is obviously not acceptable for a safety application to make the measures for checking the data integrity partly dependent on chance.

U.S. Pat. No. 8,478,056 B2 attempts to localize an error in an image data stream to optionally conceal the error by a restoration not described in any more detail. This is again directed to a human user. In a safety engineering application, the restoration could conceal a critical detection situation.

SUMMARY

It is therefore the object of the invention to provide a safe option for recognizing errors on the transmission of image data.

This object is satisfied by a method of transmitting image data and by a safe optoelectronic sensor, in which transmission errors are recognized that meta information is added to the image data prior to the transmission and the meta information is checked after the transmission. The term image data also includes precursors and processing results, for example, raw images of an image sensor, 3D image data or depth maps generated therefrom, and detection maps with recognized objects, filter masks, and the like. The image data are preferably produced from detection data of a safe optoelectronic sensor, in particular of a safety camera. The measurement points of a laser scanner can also be understood as image data. The transmission of the image data takes place safely within the optoelectronic sensor and/or within a safety system; for instance from the sensor into a connected safe control for further processing. In this respect, safe is in each case to be understood in the sense of the safety standards named in the introduction or of comparable safety standards. To check the data integrity, i.e. to recognize when data are missing, were swapped over, or are otherwise changed, meta information is added prior to the transmission. After the transmission, the meta information is checked with reference to expected values.

The invention starts from the basic idea of achieving a safe data transmission satisfying the standard by a communication link not safe per se. A black channel that was introduced in the introduction is in particular used as the transmission path for this purpose. It is therefore a standard communication that does not ensure a failsafe transfer in the sense of the standards named in the introduction. The invention manages with black channels because data losses or data changes are revealed with reference to the meta information transferred. Communication by black channels is conventionally only used from device to device via standard interfaces. However, the advantages of a cost-efficient use of standard technologies and of a simpler hardware configuration in the interior of the device are utilized here.

The meta information for the function monitoring is prepended and/or appended to the image data. The image data themselves preferably remain unchanged here. It is also possible to prepend meta information to specific partial packets of the image data or to append it thereto. Such partial packets are in particular image lines. Everywhere image lines or a line-wise processing are/is addressed in this description, image columns and a column-wise processing with a correspondingly adapted architecture of the image sensor and the processing are alternatively also meant.

To be able to check the data integrity, the meta information includes pieces of information on the structure of the image data. Transmission errors are thus initially revealed fast and reliably independently of the image content. A content check is preferably added.

The invention has the advantage that a secured transmission of image data, including raw images, three-dimensional images, and depth maps, detection maps, and filter masks is achieved via any desired unsafe transmission paths. Standard interfaces or any desired storage media, also unstructured, can thereby be used and mixed applications in hardware and software are possible. Neither the image data nor the transmission channel have to be adapted in a special manner to a safe transmission and recovery of the structure such as is frequently done in the prior art by additional, reserved code words or control lines.

A safety-related response is triggered, in particular a machine monitored on the basis of the image data is stopped, when the check of the meta information does not produce sufficient data integrity of the image data. The safe data transmission is one of the requirements for reliable personal protection by a safety sensor. If this requirement is not met and if an error is revealed, a safety-related response of the system is triggered. However, not every data error is automatically safety critical. For example, an image failure is much more serious than an incorrect transmission of an individual image line, in particular when it relates to a non-safety critical part region. Transient errors, for instance in a single frame on the recording of a plurality of frames within the response time, are also tolerable under certain circumstances.

The image data preferably comprise at least two camera recordings of a monitored zone from offset perspectives that are transmitted to a stereoscopic unit for generating a depth map in accordance with the stereoscopic principle. This is an example of a transmission path in a safe sensor, namely of the raw image data of a stereo camera to a stereoscope that searches for corresponding image features in a stereoscopic algorithm and thus estimates disparities and converts them into distances using camera parameters such as the base distance of the stereo camera. The depth map produced in this process corresponds in turn to image data that can, in accordance with the invention, be transmitted to further processing stages.

The image data are preferably transmitted within an optoelectronic sensor from an image sensor to an FPGA (field programmable gate array) and/or from an FPGA to a microprocessor. Strictly speaking, the image sensor cannot itself encode and so communicate; an assembly of the image sensor itself with a corresponding communication module, for instance a further FPGA, is therefore also understood as an image sensor. This is an example of a mixed application of the transmission in accordance with the invention between hardware (FPGA) and software (microprocessor). The FPGA and the microprocessor are only examples for evaluation modules that, however, have great advantages in image processing. An FPGA can carry out a large number of simple processing steps in a brief time; a microprocessor is in turn more flexible and has advantages for more complex evaluations, but is in turn not quite so suitable for a very fast processing of large data quantities. In the example of a safe stereo camera, the stereoscopy unit or at least the correlation for the search for feature correspondences could be implemented on an FPGA.

The image data are preferably transmitted between an FPGA and/or a microprocessor and a memory. This transmission is in each case only conceivable in one direction, that is only reading or only writing, in that, for instance, the FPGA stores a depth map for the microprocessor or the microprocessor stores a detection map with detected objects or a filter mask with hazard sites for the FPGA, but also in both directions for a later repeat access of the same module to the stored data.

The meta information is preferably prepended as a header by an encoder prior to the transmission and/or is appended as a footer, with a decoder checking the headers and/or footers. The encoder supplements the headers or footers with the meta information for the transmission. The decoder carries out its checks after the transmission in that, for example, the structure stored in the meta information is retraced in the transmitted data. The original image data were preferably transmitted in unchanged form; the headers and footers can be removed in the decoder again after the checks.

Meta information is preferably added per image and/or per image line. Depending on the embodiment, there is thus meta information, in particular headers or footers, for whole images and/or image lines. Meta information for partial packets, image lines here, have the advantage that errors are localized faster on a line-wise on-the-fly evaluation. In addition it is useful to know for the safety evaluation if an error only relates to specific lines and not, for instance, that the whole image has failed or this has to be assumed due to a lack of more exact information.

An additional encoding and decoding of the image data together with the meta data to be transmitted preferably takes place within the unsafe communication link for the actual transmission. This relates to an internal transmission plane that is encapsulated in the black channel. The actual transmission may follow practically any unsafe protocol. Advantages known per se such as data compression or data restoration can therefore also be used for this purpose. This respectively relates to other aspects than safety such as shorter transmission times, less bandwidth, or a higher success rate in the transmission. The latter in another respect only relates to the availability, by no means to the safety, since the external transmission plane in accordance with the invention with a check with reference to the meta information remains unaffected and reliably reveals errors independently of the internal transmission path. Such errors can, however, be avoided by data restoration so that safety related reactions occur more rarely.

The meta information preferably comprises magic numbers. A value that is preferably noticeable, at least recognizable, is called a magic number that only occurs randomly with a low probability in the useful data or image data, at least in combination with the value and position. In principle, the image data could randomly include any value and thus also the magic number, but this is extremely unlikely at just the expected position and is in particular precluded with a repeated use of the same magic number. In addition, a magnetic numbers can preferably be selected that occurs particularly rarely in the useful data, for instance because it is produced from natural image features with a particularly small probability, for example corresponding to a multiple sharp change of contrast in a very tight space or that does not occur at all in real image data where possible.

The presence and the position of the magic numbers in the expected structure are preferably checked after the transmission. The meta information can be very simply found in the transmitted data via the magic number. However, not only the magic number has to be able to be read, but the expected structure also has to be maintained, otherwise a transmission error is present. For example, a magic number must arranged at the start as part of a header and at the end of the transmitted data as part of a footer. Magic numbers are particularly useful as part of the meta information for image lines since they then already have to be present multiple times in the correct number and at the correct mutual distance. The structure of the transmitted data can thus be verified very fast and reliably.

Meta information is preferably prepended to the image lines and the image lines have different lengths for the transmission, but lines of equal length are padded or filled to a fixed pattern after the transmission. This is an alternative to the transmission of image lines always of the same length. Differently long image lines in particular arise due to compression. The meta information preferably respectively includes a piece of information on the actual length of the associated image line. After the transmission, the image lines are filled to the same length and are thus stored in a regular pattern. The structure can thereby be checked as if image lines of equal length had been transmitted. Magic numbers of the meta information are then in particular at regular distances from one another. Filling or padding takes place with any desired values such as zeroes or the values randomly standing at the respective points in the memory are simply maintained. The contents of the filling regions are anyway not used since remains where the actual image line ends and a filling region begins is visible from the meta information.

The meta information preferably has a check value per image and/or image line. While previously a check of the integrity of the data structure has mainly been explained, this check servers for the content monitoring of the transmitted data. The check value is, for example, a checksum (such as a CRC, cyclic redundancy check) or a hash value. The check value is again calculated after the transmission and is compared with the transmitted check value.

The meta information preferably has an image width and/or image height. This corresponds to the number of the image lines and image columns or of the respective pixels or values per image line. The geometry of the images is thus transmitted as a further structure description.

The meta information preferably has an image line value and/or an image count value. These count values are individually fixed, preferably constantly incremented, in a fixed manner for each image or each image line. Errors such as data transmissions, swaps, and missing images or image lines are thereby recognized. There are image data that do not change during the operation or at least over a whole phase of the operation, for instance filter masks for work regions or hazard sites. Such image data that are transmitted multiple times in an unchanged manner preferably include, instead of an image count value whose value would remain unchanged, an identification from which the kind of image data can be seen or a piece of information to authenticate the selected image data.

A safe optoelectronic sensor in accordance with the invention preferably has at least one image sensor and a control and evaluation unit. A linear or matrix-like pixel arrangement is called an image sensor in the narrower sense, but also a simple light receiver that executes a scan movement such as in a laser scanner in the wider sense. Image data are safely transmitted in the sensor from the image sensor to the control and evaluation unit or between modules of the control and evaluation unit using a method in accordance with the invention. Even if the sensor is preferably a closed system within a housing, the control and evaluation unit can also be arranged at least partially outside the sensor, for instance in a computer associated with the sensor or in a safe control connected to the sensor.

The sensor is preferably a safety camera, in particular a 3D camera that can in turn use any known technology such as a time of flight principle with a direct time of flight measurement of light signals or a phase measurement or a distance estimate from brightness values or focal positions (DFF depth from focus; DFD, depth from defocus). The 3D camera particularly preferably uses a triangulation principle in which two camera images of a moving camera or of a stereo camera are correlated with one another or alternatively an illumination pattern is correlated with a camera image to thus estimate disparities and to determine distances therefrom. A laser scanner also practically generates three-dimensional image data due to its periodic scanning. With a classical laser scanner, these image data are restricted to one scanning plane, but this restriction is also removed for laser scanners by a scanning moving in elevation or by a plurality of scanning beams set into elevation.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
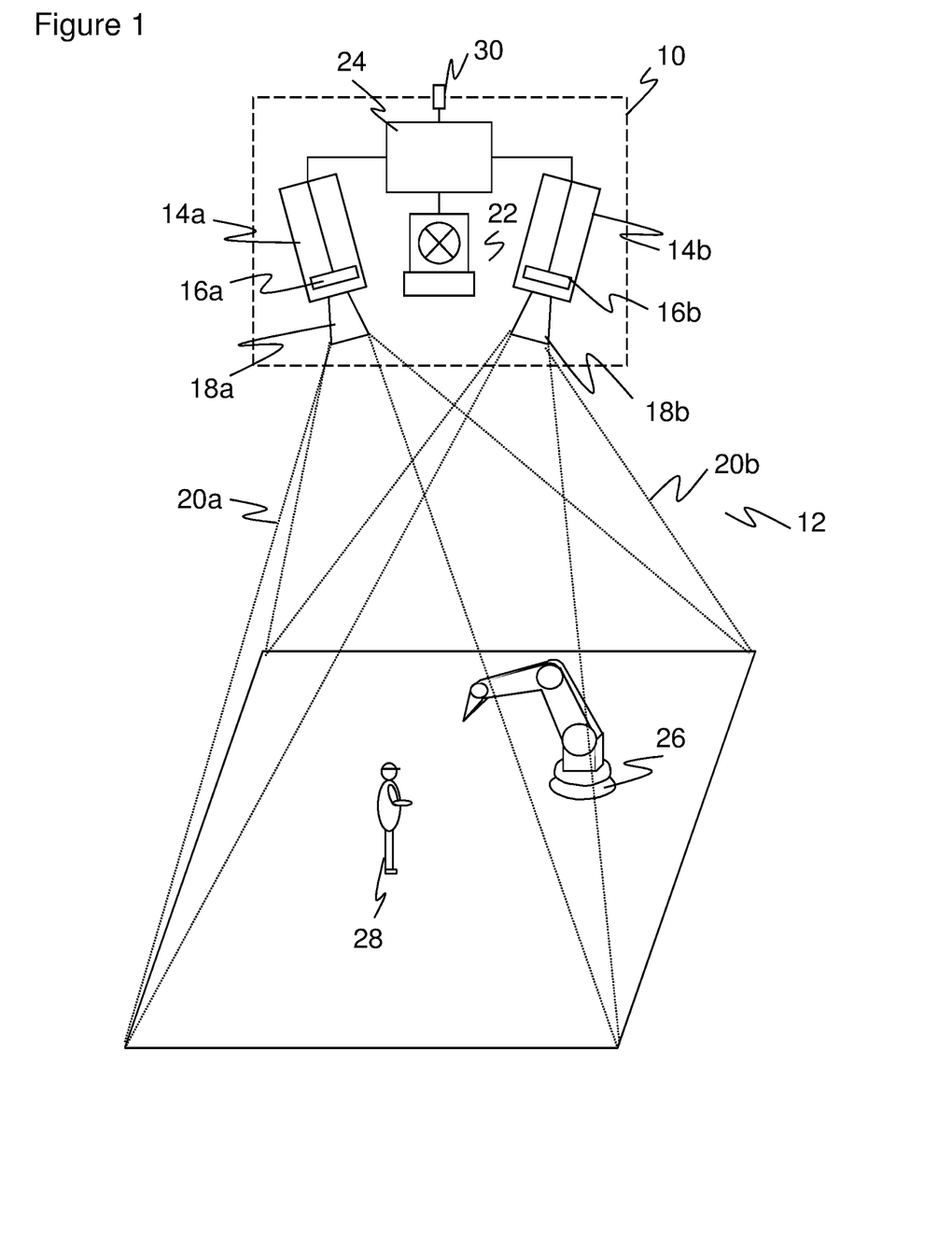
FIG. 1 a schematic three-dimensional representation of a 3D camera and its monitored zone, FIG. 2 a schematic representation of exemplary transmission paths for image data.

FIG. 1 shows the general design of a stereo camera 10 for recording a depth map in a schematic three-dimensional representation. The stereo camera 10 only serves as an example for a safe optoelectronic sensor in accordance with the invention in which image data have to be safely transmitted in different forms and processing stages. Other optoelectronic sensors, inter alia various cameras including the other 3D cameras named in the introduction, would equally be conceivable with determination of the time of flight or an evaluation of the interference of passive two-dimensional patterns or with correlation of the image and projected illumination patterns and laser scanners.

To detect the spatial zone 12, two camera modules 14a, 14b are mounted at a known fixed distance from one another therein and each take images of a spatial zone 12. An image sensor 16a, 16b, typically a matrix-type imaging chip, is provided in each camera and records a rectangular pixel image, for example a CCD sensor or a CMOS sensor. One objective 18a, 18b having an optical imaging system is associated with each of the image sensors 16a, 16b respectively which in practice can be realized as any known imaging lens. The maximum angle of view of these optical systems is shown in FIG. 1 by dashed lines which each form a pyramid of view 20a, 20b.

An illumination unit 22 is provided between the two image sensors 16a, 16b to illuminate the spatial zone 12 with a structured pattern. The stereo camera shown is accordingly configured for active stereoscopy in which the pattern also imparts evaluable contrasts everywhere to scenery that is structure-less per se. Alternatively, no illumination or a homogeneous illumination is provided to evaluate the natural object structures in the spatial zone 12, which as a rule, however, results in additional aberrations.

An evaluation and control unit 24 is associated with the two image sensors 16a, 16b and the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can be distributed over any desired internal and external components, with external components also being able to be integrated via a network or cloud provided that latencies can be managed or tolerated. Since the generation of the depth map and its evaluation is very computing intensive, an at least partly parallel architecture is preferably formed.

The control and evaluation unit 24 generates the structured illumination pattern with the aid of the illumination unit 22 and receives image data of the image sensors 16a, 16b. It calculates the 3D image data or the depth map of the spatial zone 12 from these image data with the aid of a stereoscopic disparity estimate. The total detectable spatial zone 12 or also the working region can be restricted via a configuration, for example to mask interfering or unnecessary regions.

An important safety engineering application of the stereo camera 10 is the monitoring of a machine 26 that is symbolized by a robot in FIG. 1. The machine 26 can also be substantially more complex than shown, can consist of a number of parts, or can actually be an arrangement of a plurality of machines, for instance of a plurality of robots or robot arms. The hazardous machine 26 is preferably modeled as at least one fixed or changing hazard site for the evaluation. A hazard site is a spatial zone in which the machine 26 carries out work movements in a respective time period or, a little more generally, a spatial zone that may not be touched by persons for protection from injury by the work movements. A hazard site can surround the machine 26 or partial regions of the machine 26 at a little distance to leave the work movements sufficient clearance and to be able to represent hazard sites by simple geometrical bodies such as parallelepipeds or spheres.

A preferred evaluation is a distance monitoring, for example for a human-robot collaboration while taking account of DIN EN ISO 10218 or ISO/TS 15066. The objects 28 are here detected with the aid of the image data of the stereo camera 10. An advantageous form of representation of the object detections is a 2D detection map whose pixels at positions in which an object 28 of a minimum size was detected, the distance value measured for this purpose is entered and otherwise remains empty. The shortest distance of an object 28 from the machine 26 or from a hazard site generated for the machine 26 is calculated with the aid of these object detections that can naturally also be differently represented.

The shortest distance is output via a safe interface 30 to a control either directly to the control of the machine 26 or to an intermediate station such as a safe control. The shortest distance is evaluated in the control. In the hazard case, a safety-related response is initiated in order, for example, to stop or brake the machine 26 or to cause it to evade. Whether this is necessary can, in addition to the shortest distance, depend on further conditions such as the speeds or the nature of the object 28 and the machine zone 26 of the impending collision. The safety movement can alternatively take place in the control and evaluation unit 24 itself.

A safety application such as described, on the basis of a shortest distance, is also only an example, other safety concepts are conceivable. The invention deals with data transmission, not with the specific form of the safe optoelectronic sensor for generating image data, for the monitoring, or for the evaluation. The safe transmission in accordance with the invention for raw and processed image data as a measure to adapt a safe optoelectronic sensor such as the stereo camera 10 as failsafe overall in the sense of relevant safety standards will now be explained in more detail with reference to FIGS. 2 to 5.

Figure 2:
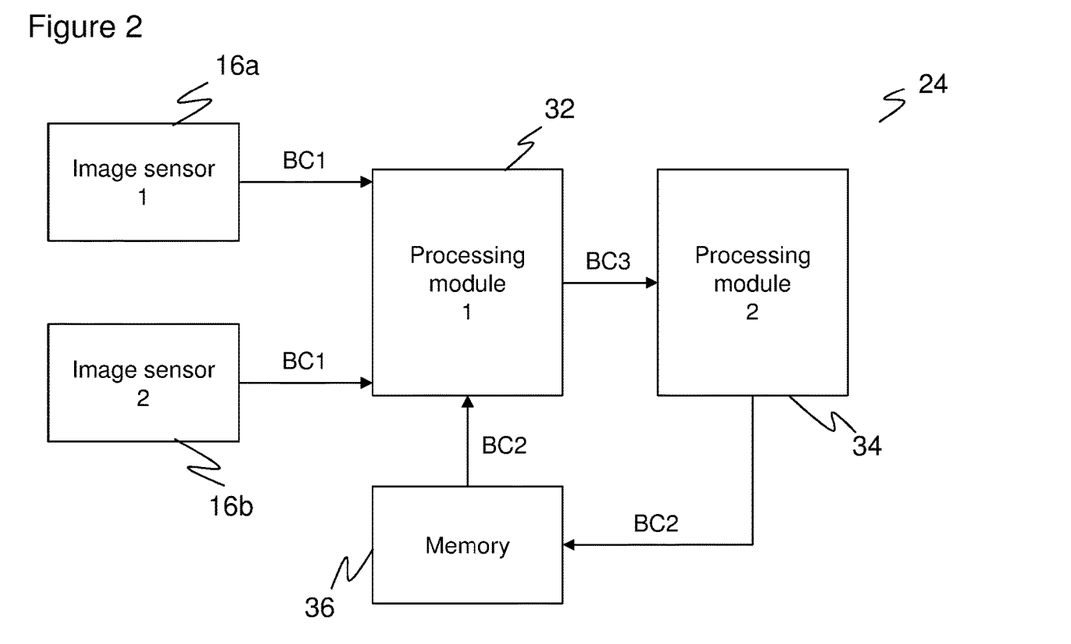

FIG. 2 schematically shows the data flow in transmission channels between different detection and processing modules. The example shown is further oriented at the stereo camera 10 without thereby restricting the data transmission in accordance with the invention to stereo cameras. The design and the data flow could already differ within a stereo camera.

The image sensors 16a-b of the camera modules 14a-b of the stereo camera 10 first generate two raw images, or example at a frequency of 50 Hz and with respectively 1280×1024 image pixels. These image data are transmitted to a first processing module 32 of the control and evaluation unit 24 by the image sensors 16a-b or by a communication module that is associated with the image sensors 16a-b and that is here in simplified terms understood as a part of the image sensors 16a-b. The image sensors 16a-b can here, purely by way of example, be accommodated on a first circuit board and the components of the control and evaluation unit 24 can be accommodated on a main circuit board, with a different number of circuit boards and a different distribution of components being conceivable. The first processing module 32 is an FPGA, for example.

Further image data generated from the raw images by the internal image processing of the first processing module 32 are transmitted to a second processing module 34, in particular to a microprocessor, and are further processed there by means of image processing software. An unsafe PCI Express interface can be used for this purpose.

Maps such as filter masks, maps with hazard sites, and the like required for the imaged processing in the first processing module are stored in a memory 36. Such maps are read synchronously with the image data to be processed from the memory 36 by the first processing module 32. The maps are stored or modified in the memory 36 in advance or at the run time of the second processing module 34.

Differing from the representation, it would also be conceivable that the first processing module 32 accesses the memory 36 in a writing manner or the second processing module 34 accesses the memory 36 in a reading manner. In a specific example, not to be understood as restrictive, the communication between the second processing module 34 and the memory 36 is implemented via PCI Express and the first processing module 32 uses the direct interface DDR4 for communication with the memory 36.

Which processing steps the first processing module 32 and the second processing module 34 possibly also take over together and which maps are stored in and read from the memory 36 varies with the specific application and implementation. Some exemplary processing steps for a safe stereo camera 10 are pre-processing steps such as a smoothing or a geometry correction, the generation of a depth map by means of a stereo algorithm, the detection of relevant objects 28 under conditions such as a minimum size or the coincidence with a body model, and the preparation of a detection map, the masking of backgrounds and known permitted objects or of hazard sites that are not themselves monitored, the calculation of distances between the hazard site and the object 28, and a safety evaluation on the basis of a shortest distance. Accordingly, image data, including depth maps, detection maps, and other maps have to be transmitted again and again between the different components.

These various exemplary transmission paths for safety relevant image data are secured for a safety application in different processing stages and the maps also called image data in a simplification are secured in the memory 36 and from the memory 36. The transmission itself takes place in accordance with the invention in a cost and hardware efficient manner on an unsafe channel and preferably via respective standard protocols. Black channels such as introduced in the introduction are preferably used for this purpose and the communication paths are accordingly shown in FIG. 2 by arrows marked by BC. The appended numeral should designate respective adapted implementations for the different modules involved; this will be differentiated a little more exactly further below.

The securing of the data does not take place by securing the transmission path itself, for they are here unsafe communication channels or black channels, but rather by a check on the receiver side using meta information. For this purpose, the image data is supplemented by meta information prior to the transmission in an encoder that prepends or appends headers and/or footers image-wise and/or image line-wise. The meta information is checked and preferably removed again in a decoder on the receiver side of the transmission channel.

Figure 3A:
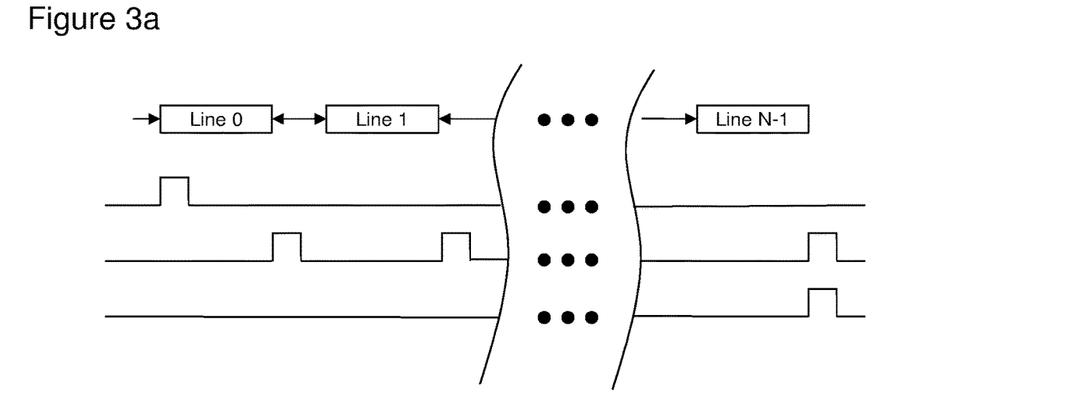
FIG. 3a a schematic representation of the image lines with respect to image data to be transmitted and the points of time at the start or end of a frame and of a respective image line to illustrate an encoder.
Figure 3B:
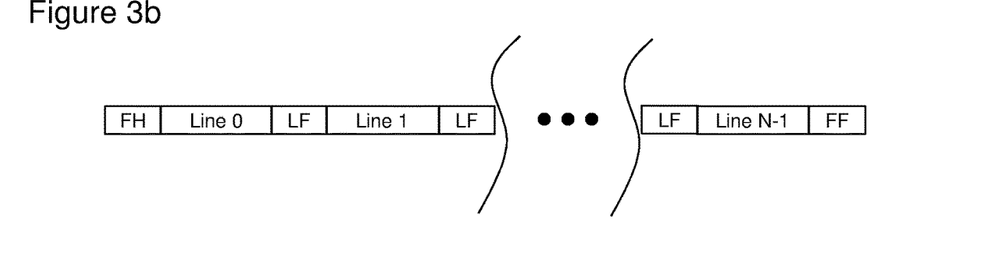
FIG. 3b a schematic representation of the image lines in accordance with FIG. 3a after the encoding for the transmission.

The function of the encoder will be illustrated by way of example in FIG. 3a while FIG. 3b shows an example for the resulting image data complemented by the meta information. The actual image data line 0 . . . line N-1 is shown at the top in FIG. 3a, with the image data being pushed apart to make room for the meta information in the data stream. Three pulse trains are shown below whose increasing flank marks in this order from top to bottom the start of an image (frame), the end of a respective image line (line), and the end of the image.

As shown in FIG. 3b, a header is inserted at the start of the image (FH, frame header), a respective footer is inserted after every image line (LF, line footer), and a footer is inserted at the end of the image (FF, frame footer) with the aid of these points in time, said frame footer here simultaneously taking over the function of the footer for the last line N-1 that can alternatively additionally be inserted. The actual image data lines 0 . . . line N-1 are included in unchanged form in the encoded data stream.

The headers and footers shown do not all have to be inserted. It is conceivable only to provide meta information per image (frame) or only one image line (line), and indeed respectively as a header and/or footer. Other partial packets than image lines are also conceivable, for instance fragments of image lines, a plurality of image lines, or non-linear image sections. Image columns are not understood as other partial packets, but rather preferably fall under the term image line since this is only a convention that depends on the orientation or architecture of the image sensor and of the processing.

Figure 4:
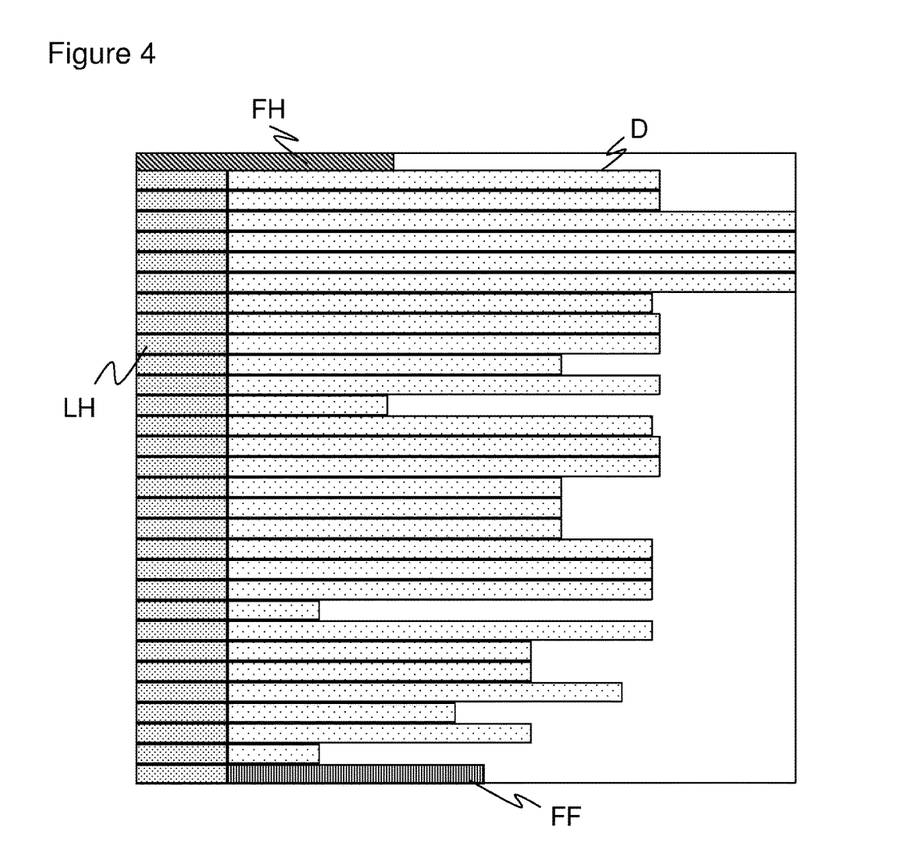
FIG. 4 a schematic representation of the structure with respect to image lines to be transmitted of different lengths together with headers and footers.

FIG. 4 shows an example of other image data with the special feature that the image lines are not of equal length. This can be the result of a compression that can shorten the different image lines to different degrees. It can be advantageous in this case to use headers (LH, line headers) for the image lines instead of or in addition to footers whose meta information inter alia includes the shortened image line length.

The meta information inserted at different positions in dependence on the embodiment includes structural markings to secure the transmission. Which structure is to be expected with correctly transmitted image data can be seen from these structural markings. A content securing is preferably added.

In particular magic numbers are used as the structural marking. The start or end of the image is thus recognized by the decoder on the receiver side of the transmission channel in a header or footer for the whole image (FH or FF). A whole field of magic numbers results in a header or footer of an image line (LH or LF) at a mutual, in particular regular, distance known in each case from the meta information. The combination of the expected value of the magic number and of the respective expected position in the data stream ensures the integrity of the structure. The further meta information of the headers or footers can thereby also be reliably identified and used via the position.

The magic numbers can have yet further functions. Different magic numbers can thus be used to authenticate data streams, for instance when different data streams are transmitted by the same interface. In addition, magic numbers can be selected such that they can be used to check the desired endianness.

The content integrity of the transmitted image data including the meta information can be verified by checksums or similar hash processes such as CRC. The calculated checksums or hash values are transmitted with the meta information and can thus be replicated and cross-checked in the decoder.

The headers or footers can comprise further meta information. It includes the height and width of an image, that is the number of image lines in an image and pixels in an image line. A further advantageous example is represented by line numbers and image numbers with whose aid it is quickly recognized if a frame or an image line is missing, or was transmitted twice or in an incorrect order. In some fixed maps that are used multiple times, a counter is not sensible since the map and thus the count does not change. Instead, an identification number can be used from which it can be seen which map it is.

Overall in accordance with the invention and in addition to the securing of the different data streams, the respective structure and geometry of the images are safely transmitted and restored. Neither unused code words in the image data nor additional control lines are required here. This would also not be possible at all and would at least require an increased effort with respect to circuitry, processing power, or FPGA resources.

Since now a number of examples have been explained for meta information, the different types of black channels BC1, BC2, and BC3 in FIG. 2 can also be explained a little more exactly that namely above all differ in their meta information that is required for the respective special case. However, the common ground should not be forgotten by this differentiation, namely the safe transmission by black channel with a check of the image data structure using prepended or appended meta information. For the differentiations of the black channels BC1, BC2, BC3 depend to a large degree on the very specific implementation in a stereo camera 10 in accordance with FIG. 2, whereas the securing concept in accordance with the invention for black channels is per se very flexible and general.

A structure such as in FIG. 3b with footers for image lines of the same length is used in the black channels BC1 and BC2. In contrast, black channel BC3 uses the headers for image lines of different lengths as in FIG. 4 since here images with compressed line content and accordingly different line lengths should also be transmitted here. For an efficient verification of the data stream in the decoder on the receiver side of the transmission channel that takes place by software in the case of BC3, the headers of the image lines are preferably stored in a fixed pattern even though the image lines per se are of different lengths. The pattern is, for example, derived from the largest possible line length. The image lines are so-to-say filled or padded to a very large length using dummy vales, for instance with zeroes, or in that the memory regions not used simply maintain the present value. The image lines are thus transmitted in shortened form so that bandwidth is saved here by the compression, but deliberately take up the whole space in the memory to simplify the verification. For the software of the decoder can now simply check the magic numbers at the respective line beginnings and can read the respective further meta information.

The two black channels BC1 and BC2 differ from one another inter alia in that no image counter is implemented for the black channel BC2. This is due to the fact that at least some of the maps stored in the memory 36 do not change with the respective newly detected raw images of the image sensors 16a-b, but rather the same memory range is read out again and again. An identification number is then preferably transmitted in the meta information instead of an image counter to identify the map. This is in particular of advantage when different maps are selected in operation by changing the start address of the map. The identification number then serves for the authentication of the desired map. In another respect, maps that anyway do not change in operation or at least for longer operating phases, can also already be stored in encoded form together with headers or footers, under certain circumstances already as part of a calibration during the production or configuration of the sensor to save the additional effort for the encoding that is always the same in this case.

Figure 5:
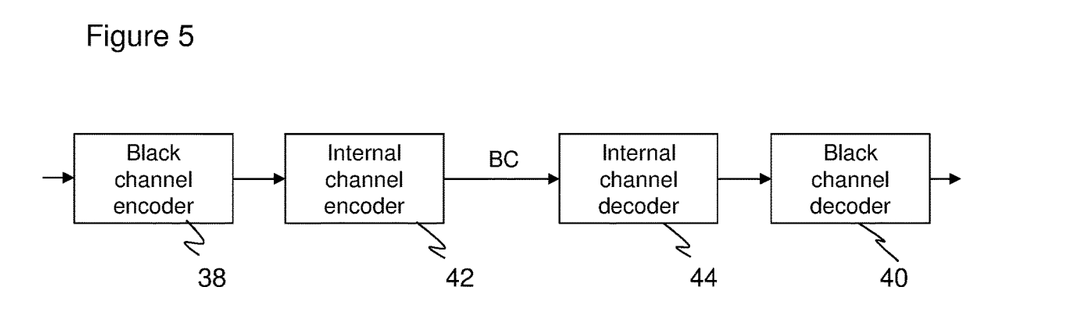
FIG. 5 a schematic representation of the transmission in a black channel with an additional internal encoding of the transmitted data.

FIG. 5 illustrates yet a further optional encoding step. It has previously been explained with reference to different embodiments how meta information is first added by an encoder 38 prior to the transmission and how then, after the transmission, the data integrity is checked with reference to the meta information in a decoder 40 on the receiver side of the transmission channel. In addition, an internal channel encoding can be supplemented by a further encoding 42 prior to the transmission and by a further decoding 44 after the transmission to further increase the operating safety and availability. The internal channel encoding 42, 44 therefore takes place on a plane within the secured black channel communication 38, 40. Protocols known per se that are in particular error correcting can be used for the internal channel encoding 42, 44. Examples include ECC (error correcting codes) in the case of an external memory or an FEC (forward error correction). The internal protocol is only responsible for reducing the transmission rate according to its possibilities. Safety remains ensured over the plane of the black channel in accordance with the invention disposed thereabove in which any errors of the internal protocol would also become noticeable.

The invention claimed is:

1. A method of transmitting image data in one of a safety sensor and a safety system, in which transmission errors are recognized in that meta information is added to the image data prior to the transmission and the meta information is checked after the transmission,
    wherein the image data generated from raw images and communicated via internal data flow are transmitted by an unsafe communication link;
    wherein the meta information is prepended and/or appended to at least one of the image data and partial packets of the image data;
    wherein the meta information comprises a piece of information on the structure and geometry of the image data;
    and wherein the sensor is a safety sensor or the system is a safety system for monitoring a machine in terms of a safety standard for the protection of persons;
    determining content integrity of the transmitted image data, the determining comprising checking the meta information with reference to expected values or values consistent with the transmitted image data, and triggering a safety-related response for safeguarding the machine if the checking of the meta information does not result in sufficient data integrity of the image data, and
    supplementing an internal channel encoding and decoding by a further encoding prior to the transmission and by a further decoding after the transmission, the supplementing the internal channel encoding with the internal channel encoding taking place within secured black channel communication.

2. The method in accordance with claim 1,
    wherein the image data are transmitted by a black channel.

3. The method in accordance with claim 1, wherein the safety-relevant response comprises the stopping of a machine monitored on the basis of the image data.

4. The method in accordance with claim 1,
    wherein the image data comprise at least two camera recordings of a monitored zone from offset perspectives that are transmitted to a stereoscopic unit for generating a depth map in accordance with the stereoscopic principle.

5. The method in accordance with claim 1,
wherein the image data within an optoelectronic sensor are transmitted from at least one of an image sensor to an FPGA and from an FPGA to a microprocessor.

6. The method in accordance with claim 1,
wherein the image data are transmitted between at least one of an FPGA and a microprocessor and a memory.

7. The method in accordance with claim 1,
wherein the meta information is prepended as a header and/or is appended as a footer by an encoder prior to the transmission; and wherein a decoder checks headers and/or footers.

8. The method in accordance with claim 1,
wherein meta information is added per image and/or per image line.

9. The method in accordance with claim 1,
wherein the further encoding and further decoding of the image data together with the meta information to be transmitted takes place within the unsafe communication link for the actual transmission.

10. The method in accordance with claim 1,
wherein the meta information comprises magic numbers.

11. The method in accordance with claim 10,
wherein the presence and the position of the magic numbers in the expected structure are checked after the transmission.

12. The method in accordance with claim 1,
wherein meta information is prepended to the image lines and the image lines have different lengths for the transmission, but lines of equal length are filled to a fixed pattern after the transmission.

13. The method in accordance with claim 1,
wherein the meta information comprises a check value per image and/or image line.

14. The method in accordance with claim 1,
wherein the meta information comprises an image width and/or an image height.

15. The method in accordance with claim 1,
wherein the meta information comprises an image line count value and/or an image count value.

16. A safe optoelectronic sensor, having at least one image sensor and a control and evaluation unit,
wherein image data are transmitted from the image sensor to the control and evaluation unit or between modules of the control and evaluation unit using a method of transmitting image data in one of a safety sensor and a safety system, in which method transmission errors are recognized in that meta information is added to the image data prior to the transmission and the meta information is checked after the transmission, wherein the image data generated from raw images and communicated via internal data flow are transmitted by an unsafe communication link;

wherein the meta information is prepended and/or appended to at least one of the image data and partial packets of the image data;

wherein the meta information comprises a piece of information on the structure and geometry of the image data;

wherein the sensor is a safety sensor or the system is a safety system for monitoring a machine in terms of a safety standard for the protection of persons, said monitoring comprising checking the meta information with reference to expected values or values consistent with the transmitted image data, and triggering a safety-related response for safeguarding the machine if the checking of the meta information does not result in sufficient data integrity of the image data;

and wherein an internal channel encoding and decoding is supplemented by a further encoding prior to the transmission and by a further decoding after the transmission, the supplementing the internal channel encoding with the internal channel encoding taking place within secured black channel communication.

17. The safe optoelectronic sensor in accordance with claim 16 that is a 3D camera.

* * * * *